No. 870,253.　　　　　　　　　　　　　　　PATENTED NOV. 5, 1907.
E. O. SCHWEITZER.
ELECTRIC COMPENSATOR.
APPLICATION FILED NOV. 2, 1904.
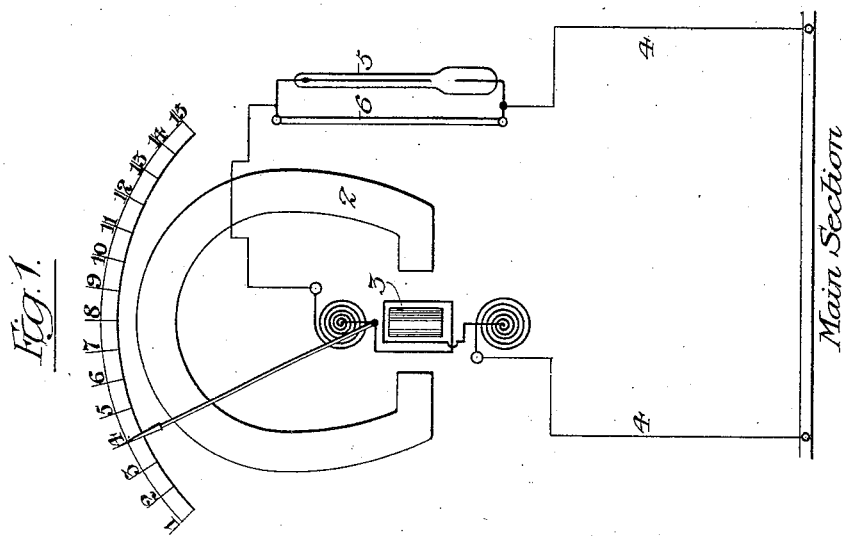
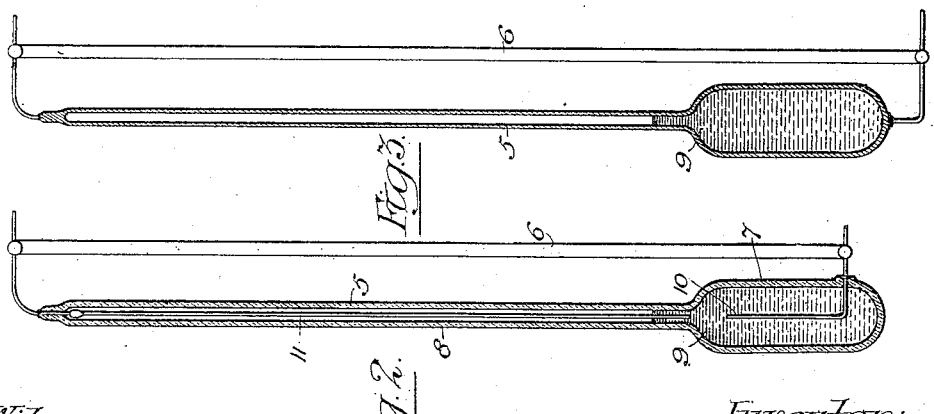

UNITED STATES PATENT OFFICE.

EDMUND O. SCHWEITZER, OF CHICAGO, ILLINOIS, ASSIGNOR OF ONE-HALF TO JOHN J. SCHAYER, OF CHICAGO, ILLINOIS.

ELECTRIC COMPENSATOR.

No. 870,253.  Specification of Letters Patent.  Patented Nov. 5, 1907.

Original application filed December 14, 1903, Serial No. 185,093. Divided and this application filed November 2, 1904. Serial No. 231,169.

*To all whom it may concern:*

Be it known that I, EDMUND O. SCHWEITZER, a citizen of the United States, residing at the city of Chicago, in the county of Cook and State of Illinois, have invented a certain new, useful, and Improved Electric Compensator, of which the following is a specification.

My invention relates to measurement of electricity, and has special reference to meter compensation.

This is a divisional application, the subject-matter hereof having been first shown and described in my pending application entitled "Electric compensator" filed Dec. 14th, 1903, Serial No. 185,093.

The invention refers, particularly, to means for automatically correcting the errors caused in electric instruments by internal and external variations of temperature, resulting in changes of electric resistance in the circuit which includes said instrument, or in the main-line section whereon the energy is measured. Instruments that are used for indicating or recording the fall of potential between two points upon an electric main are particularly sensitive or responsive to such changes of resistance. Such an instrument is actuated by a component part of the energy from the electric main. In adapting the instrument to the particular duty to be performed, the electric resistances of the measuring shunt or section of said main and of the instrument, including its circuit, are determined at a certain temperature, called the normal temperature. While this temperature remains constant in the main and the instrument, the ratio of resistances in the main and the instrument will be constant, and the instrument will derive the exact, proper actuating current from the electric main. Under such conditions, the instrument will accurately indicate the fall of potential between two points upon the main, or, if of a certain class, will give an accurate reading in amperes. But it is well-known that the resistance of the metals which are commonly used in electric conductors varies according to the temperature of the metal, increasing with a rise of temperature. Any change from the low, normal temperature, therefore, results in changing the electric resistance of the measuring section or shunt in the main, or of the windings of the electric instrument, or both. In either case, the proper ratio of resistance is disturbed or distorted, and the indications of the instrument will be high or low according as the increase of resistance occurs in the electric main or in the instrument windings or local circuit. The errors thus occasioned become material when the instrument is employed upon a main which leads from a large electric generator, frequently amounting, in a final careful determination, to a difference of many kilowatts. Out of this fact has grown up the practice, the necessity, in fact, of observing the temperature of the medium or atmosphere in proximity to the conductor section or shunt and in proximity to the electric instrument, and the using of such observations in conjunction with the known temperature co-efficients of the metals serving as conductors, in careful mathemetical calculations having for their purpose the correction of meter errors, to the end that the quantitative determination of the energy upon the main shall be definite and accurate.

The object of my invention is to provide a device, which, used in connection with an electric measuring instrument, shall automatically compensate temperature-induced resistance, and do away with the necessity for supplementary mathematical calculations or determinations. Stated in different words, the object of my invention is to provide means for automatically maintaining the actuating current in the windings of an electric instrument in constant ratio with the main current whereof it is a component part; and which shall accomplish this end by manipulating or varying the resistance of the meter circuit.

The specific object of my invention, so far as same affects commercial usages, is to do away with the necessity for using either what is known as a negligible temperature co-efficient shunt or a compensating coil of the same metal as the shunt section of the electric main, and wound to assume the same temperature as said shunt section and in series with the meter, neither of which accomplishes the purpose for which it is intended.

My invention consists, broadly, in a compensator comprising a device to be included in the circuit of an electric measuring instrument, and whose conductivity changes or varies in proportion to the variations of temperature experienced by said instrument or its circuit; said device operating automatically to adjust the resistance of the meter circuit to correspond to the variations of resistance produced by such changes of temperature in the instrument or connected part, and causing the instrument to at all times receive its proper component of actuating current; and further, my invention consists in a compensating instrument in series arrangement in the instrument circuit and comprising a variable resistance member, sensitively responsive to changes of temperature, in combination with a fixed resistance member, which reduces the effective resistance of the first member, as required to make the same correspond exactly to the temperature co-efficient to the electric part whose abnormal or temperature-induced resistance is to be compensated for; and further my invention consists in details of construction and in combinations of parts, all as hereinafter described and particularly pointed out in the claims.

My invention will be more readily understood by reference to the accompanying drawings, forming a part of this specification, and in which:—

Figure 1, is a diagrammatic view illustrating an electric compensator embodying my invention, in connection with an electric measuring instrument, showing the manner of using the compensator when positive instrument compensation is required; Fig. 2, is an enlarged sectional view of the electric compensator; and Fig. 3, is a similar sectional view of one of several modifications of the compensator.

As shown in the drawings, 2 represents an electric measuring instrument of the kind used for indicating a fall of potential.

3 represents the winding of the instrument.

4, 4, are the two leads of the meter or local circuit the terminals of which are connected to the main where on the fall of potential is to be measured.

It is well known, and will be obvious to all that an increase of resistance in the instrument winding or its local circuit will cause proportionately less current intensity in said instrument winding, assuming that the resistance of the main section or shunt remains substantially constant, while that of the instrument increases. This condition or production of an increase of resistance in the meter circuit causes a proportional deflection of the current from said circuit, so that the instrument fails to receive its full component of actuating current.

Volt-meters or measuring instruments which are used to indicate a fall of potential proportional to a current flowing in a main or conductor, are at present connected, as follows: The terminals on the instrument are connected to the extremities of the shunt. In this case, the shunt is composed of a metal whose resistance is not appreciably varied by changes of temperature, and the principal error that occurs takes place in the copper windings of the instrument itself, since these windings change their resistance with changes of temperature and are always made of copper. In another case where it is desired to dispense with the shunt having a negligible temperature co-efficient, or metal composed of material whose resistance is not changed by changes of temperature, the conductor or section of the main or feeder itself, is used, which, of course, has a variable resistance due to its appreciable temperature co-efficient. It becomes desirable to use this copper section or shunt on the main or feeder, in order to dispense with the mechanical difficulties and expense encountered in connecting a shunt of neglible temperature co-efficient; also, to gain the room which this shunt takes up as compared to the room naturally occupied by the copper feeder; also, to decrease the drop or fall of potential in the feeder itself and its consequent dissipation of energy.

When the shunt or section of the main circuit is composed of copper, an attempt is frequently made to have the resistance of the local or meter circuit vary in proportion to the resistance of the section of the main circuit, by connecting, in series with the meter, a fine wire coil; which constitutes 90% or more of the entire resistance of the meter circuit. This coil, in order to have the resistance of the meter circuit change the same way that the resistance of the shunt or section of the main circuit does, should be located in a place on the shunt or section of the main circuit which represents the mean temperature of the shunt or section of the main circuit. In practice, it is found that this can never be located, and even if it could be located, it would be impracticable to put the coil on at such location. It follows, therefore that it is much more simple to determine the mean temperature in which the shunt is immersed than it would be to determine the point at which the compensating coil should be located on the shunt, and to vary the resistance of the local or meter circuit according to the temperature in which the shunt or section of the main circuit is immersed.

When the temperature-induced resistance that detrimentally affects the operation of the instrument is found to be in the instrument circuit or in the instrument winding itself, my conception is that the error should be corrected by directly entering the instrument circuit and arbitrarily varying its total resistance in inverse proportion to the variation of temperature which produces the objectionable change in the ratio of the main and meter circuit resistances, and hence their current intensities. The accomplishment of the corrective plan above stated is attained by introducing in the meter circuit, a device which I call a variable-resistance compensator, whose electric conductivity is directly proportional to the changes of temperature to which it and the part for which it compensates are exposed. The compensator preferably comprises a variable resistance member, 5, and a fixed resistance member, 6, that are arranged in parallel. The resistance of the member, 5, has a definite range of resistance, and within the range its variations of resistance are exactly proportioned to the variations of temperature affecting it. These variations, however, are usually greater than the variations of resistance produced by the same changes of temperature in the instrument, its circuit or the main conductor section. It is necessary, therefore, to provide means for fitting or adjusting the effective changes of resistance by the member, 5, so that the variation of resistance thereby will exactly compensate for and correspond to the change of resistance in the meter or its circuit, including the main. The fixed resistance member, 6, serves to thus adjust or fit the effective resistance of the member, 5, to the particular instrument in question. It is composed of material having a negligible temperature co-efficient, that is, of a composition whose conductivity is not appreciably altered by changes of temperature. Its resistance is determined to suit the requirements attending the use of the compensator, and according to such requirements may be equal to or greater or less than the maximum resistance of the variable resistance member, 5. When, therefore, the two members are arranged in parallel relation and connected to a meter circuit, each will carry a portion of current instead of all thereof having to traverse the member, 5. This being the case, the effective variation of resistance by the automatically operated member, 5, will, per unit of temperature variation, be proportional to the relative resistance of the members, 5, and 6, constituting the compensator. In other words, the effect of the resistance inherent to the member, 5, will be reduced in proportion to the given conductivity of the fixed resistance member, 6, and, as a matter of course, the units or divisions of resistance in the member, 5, will, so far as concerns their effect upon the instrument circuit, represent less amounts.

Fig. 1, of the drawings illustrates an example of the use of the compensator, where it is desired to produce positive compensation in the measuring instrument. In such a case, the compensator is, or will be, arranged in proximity to the instrument wherein the objectionable temperature-induced resistance occurs. As explained, such additional resistance in the electric instrument or its immediate circuit will cause a disproportionate current intensity in the windings of the instrument, while the resistance of the main may be said to remain substantially constant. The error that would be occasioned by such a change of the ratio of resistance and intensities upon the main and the instrument, is corrected by arranging the compensator, considered as a whole, in series with the measuring instrument. The effective resistance of the compensator is then, by means of the fixed resistance member, 6, adjusted to correspond to the temperature co-efficient of the section of main conductor. As a result, its conductivity will properly increase as the conductivity of the instrument winding decreases, and vice versa. Changes of resistance in its own local circuit, cause the instrument to receive less or more than its proper component of current from the electric main. The compensator is arranged in series with the instrument, and, when the resistance of the meter circuit is changed by a change of temperature, the compensator will automatically operate to adjust its own resistance to the changed condition of the meter circuit, and maintain the sum total of the resistance upon the meter circuit constant, thus permitting the instrument to receive its full and proper component of current from the electric main, so that it may accurately indicate the drop of potential between the points of measurements on the electric main.

Proceeding, now, to a description of the construction of the compensator in detail, and referring to Fig. 2 of the drawings, it will be observed that the variable resistance member of the compensator comprises a tube of glass or other material, having a bulb, 7, and a preferably graduated tube portion, 8, like unto a thermometer. This is sealed at the ends, and incloses a small body of mercury or like fluid which is a conductor of electricity. The bulb, 7, contains a sealed-in terminal wire or electrode, 10, always immersed in the mercury or other liquid or substance. The tube, 8, contains a long terminal wire or electrode, 11, of desired composition and of preferably uniform cross-section. The upper end of the wire is preferably sealed in the end of the tube, and preferably the wire nearly fills the capillary tube. The ends of the electrodes or wires, 10, 11, approach one another but do not meet. They are, however, always electrically connected by the intervening stand of mercury. When the mercury or other substance constituting the movable element, is expanded by heat, it rises in the tube and immerses more or less of the long electrode, 11, according to the temperature attained. The temperature co-efficient of the electrode, 11, may be, and preferably is, a negligible quantity, and the composition of such electrode and its cross-section, the cross-section of the mercury column and the conductivity of the mercury, are all determined according to the conditions under which the compensator will be used. The physical and electrical properties of the parts of the compensator may be so carefully determined and adjusted that the member, 5, may alone be used in an instrument circuit; but generally no effort is made to adapt the member, 5, to any particular measuring instrument, the fixed member, 6, being depended upon for such exact adaptation. The cross-sections of the tube, 8, fluid column and electrode, 11, are substantially uniform throughout, therefore, the resistance of such parts will be regularly varied with each unit of rise or fall of the liquid within the tube. The conductivity of the member, 5, will therefore be directly proportional to the height of the liquid within the tube. The tube is calibrated like a thermometer, to determine its range and variations of resistance, and to provide the tube with thermometric graduations. The maximum resistance of the member, 5, when the mercury therein is at a point corresponding to the lowest temperature to which it is likely to be subjected, is preferably always proportionally greater than the range of temperature-induced resistance compensated for. As stated, the parallel or fixed resistance member, 6, of the compensator serves to adjust and fit the effective variation of resistance by the member, 5, to a particular case; and the size of cross-section and length as well as the composition of the member, 6, is determined for each instrument.

My invention is capable of embodiment in many forms, of which that described is one. Another form is illustrated in Fig. 3, wherein a metal tube is employed in place of the glass tube of Fig. 2. In this case, the tube is partially filled with mercury or other liquid, and the electric connections are made to the ends of the tube. The liquid within the tube is preferably of greater conductivity than the walls of the tube, and the resistance of the device, as a whole, is therefore varied according to the height or length of the column of liquid in the tube, the resistance being reduced as the column approaches the top of the tube. The rate of variation of conductivity should be changed and altered, as required for each meter, and I prefer to always employ a fixed resistance 6, with this metallic form of the variable resistance member, 5.

It is obvious that numerous modifications of my invention will readily suggest themselves to one skilled in the art and I do not therefore confine the invention to the specific constructions herein shown and described.

Having thus described my invention, I claim as new and desire to secure by Letters Patent:

1. A compensator for electric measuring instruments and the like, comprising an electrical device whose conductivity varies in proportion to the temperature to which it is subjected, and a fixed resistance member, the whole being arranged in the circuit of an electric measuring instrument, and adapted to compensate for changes of resistance in said circuit or a connected part, induced by changes of temperature therein, substantially as described.

2. An electric compensator, comprising a variable resistance member, containing a liquid column, sensitively responsive to changes in its temperature, in combination with a fixed resistance member arranged in parallel circuit-relation therewith, the whole being included in a temperature-varied-resistance circuit, substantially as described.

3. An electric main, a measuring instrument, and the derived instrument circuit connected with said main, in combination with an electric compensator, comprising two members, in parallel relation, together arranged in series in said instrument circuit, one of said members being a fixed resistance member and the other being such that its conductivity varies in proportion to the temperature to which the instrument is subjected, to compensate for temperature-induced changes of resistance therein, substantially as described.

In witness whereof, I have hereunto set my hand this 29 day of October, 1904, in the presence of two witnesses.

EDMUND O. SCHWEITZER.

Witnesses:
CHARLES GILBERT HAWLEY,
JOHN R. LEFEVRE.